United States Patent

Presley et al.

[11] 3,893,692
[45] July 8, 1975

[54] COMBINATION VEHICLE STABILIZER COMPENSATED TO PREVENT AUTOMATIC BRAKE APPLICATION IN NORMAL TURN OR IN PASSING

[75] Inventors: Rex W. Presley; Lawrence E. Slimak, both of Southfield, Mich.

[73] Assignee: The Bendix Corporation, South Bend, Ind.

[22] Filed: Feb. 27, 1974

[21] Appl. No.: 446,246

[52] U.S. Cl. .................. 303/7; 180/103; 303/24
[51] Int. Cl. ............................................. B60t 11/00
[58] Field of Search........... 180/103, 82 R; 188/112, 188/3 R; 303/7, 20, 24

[56] References Cited
UNITED STATES PATENTS

| 2,152,017 | 3/1939 | Banning, Jr. | 188/112 |
| 3,566,987 | 3/1971 | Franzel | 180/103 |
| 3,715,003 | 2/1973 | Jubenville | 180/103 |
| 3,758,165 | 9/1973 | Savelli | 303/7 |
| 3,819,234 | 6/1974 | Couchois et al. | 180/103 |

Primary Examiner—David Schonberg
Assistant Examiner—Michael J. Forman
Attorney, Agent, or Firm—Leo H. McCormick, Jr.; William N. Antonis

[57] ABSTRACT

An anti-sway apparatus for use in a tow vehicle-trailer braking system to provide the wheel brakes of the trailer with an actuation signal sufficient to initiate a lesser acceleration in the trailer than in the tow vehicle to develop a uniform acceleration in the tow vehicle-trailer combination.

9 Claims, 4 Drawing Figures

COMBINATION VEHICLE STABILIZER COMPENSATED TO PREVENT AUTOMATIC BRAKE APPLICATION IN NORMAL TURN OR IN PASSING

BACKGROUND OF THE INVENTION

With an ever increasing number of people purchasing recreational vehicles it is of utmost importance that stability between the tow vehicle and the trailer is maintained while traveling at turnpike speeds. One form of instability exhibited by these vehicles is swaying where the trailer oscillates back and forth similar to a pendulum. Another stability problem can occur during a quick lane change. This can result in severe yawing in the trailer which can lead to loss of control of the tow vehicle. Similar yawing can be caused by passing or being passed by a semi-trailer or by a gusty crosswind. In addition tow vehicle-trailer combinations have a critical speed above which control is difficult or impossible to uniformly maintain. This critical speed is usually somewhat slower than the desired speed for highway driving creating a hindrance for a smooth traffic flow pattern.

To alleviate these sway stability problems some of the larger trailers are equipped with damping or spring devices attached to the hitch. These damping devices normally consist of at least one shock absorber located on opposite sides of the tongue of the trailer. These devices improve trailer control at low speeds, but do not effect the critical speed so that the safe speed is still limited.

In addition stiffening of the sidewalls of the tires on the trailer have helped to dampen some of the sway forces when traveling at low speeds. However, it has been found that at high speeds the damping characteristics of the tires have little overall effect on the total oscillatory movement of the trailer.

SUMMARY OF THE INVENTION

We have devised an anti-sway apparatus wherein a first output from a first sensor means is compared with a second output of a second sensor means for developing an actuation signal capable of momentarily operating the wheel brakes in the trailer. The first and second sensor means monitors the lateral movement of the trailer with respect to the tow vehicle to create the first and second outputs which are communicated to a comparator means. A switching means in the comparator means responsive to the first and second outputs will permit the development of the actuation signal. A control means located between the comparator means and the wheel brakes of the trailer will nullify the actuation signal if the longitudinal acceleration forces, such as that developed during passing exceed a predetermined value to prevent interference of the passing maneuver. A feedback from the actuation signal transmitted to the wheel brakes is communicated to the control means to limit the actuation signal sufficiently to prevent wheel lock up on the trailer.

It is therefore the object of this invention to provide a tow vehicle-trailer combination with an anti-sway means for sensing trailer instability and providing a brake actuation signal to automatically apply the wheel brakes thereon when lateral acceleration reaches a preselected value.

It is another object of this invention to provide an anti-sway means with a control for nullifying a brake actuation signal during a preselected longitudinal acceleration period.

It is a still further object of this invention to provide a control means for an anti-sway means wherein a brake actuation signal is prevented from being developed when lateral acceleration of the tow vehicle and trailer are equal.

It is a still further object of this invention to provide an anti-sway means with a control means for limiting a developed brake actuation signal to prevent wheel lock up.

It is a still further object of this invention to provide a control means for preventing any brake actuation signal generated by an anti-sway apparatus from affecting the operation of the wheel brakes on the trailer during operator initiated braking.

These and other objects of this invention will be apparent from reading this specification and viewing the drawings.

DETAILED DESCRIPTION OF THE PREFERRED EMBODIMENT

Figure 1:
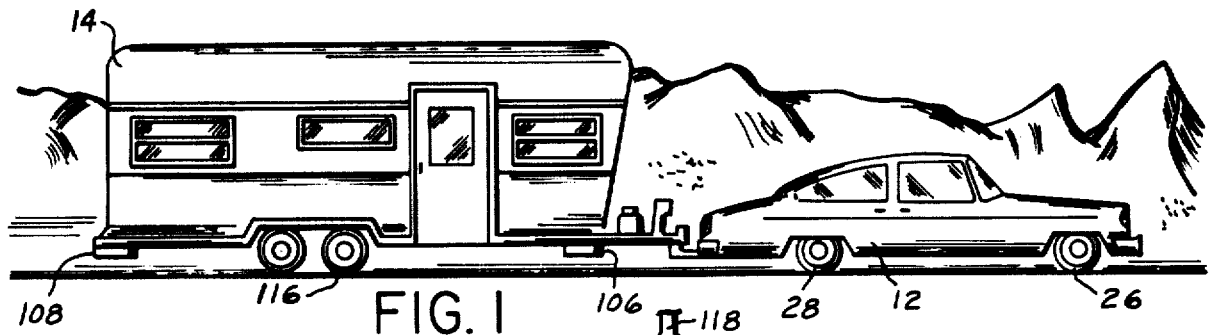
FIG. 1 is a schematic illustration of a typical tow vehicle-trailer combination wherein the anti-sway apparatus of this invention can readily be utilized to provide stability in movement of the trailer in highway traffic.
Figure 2:
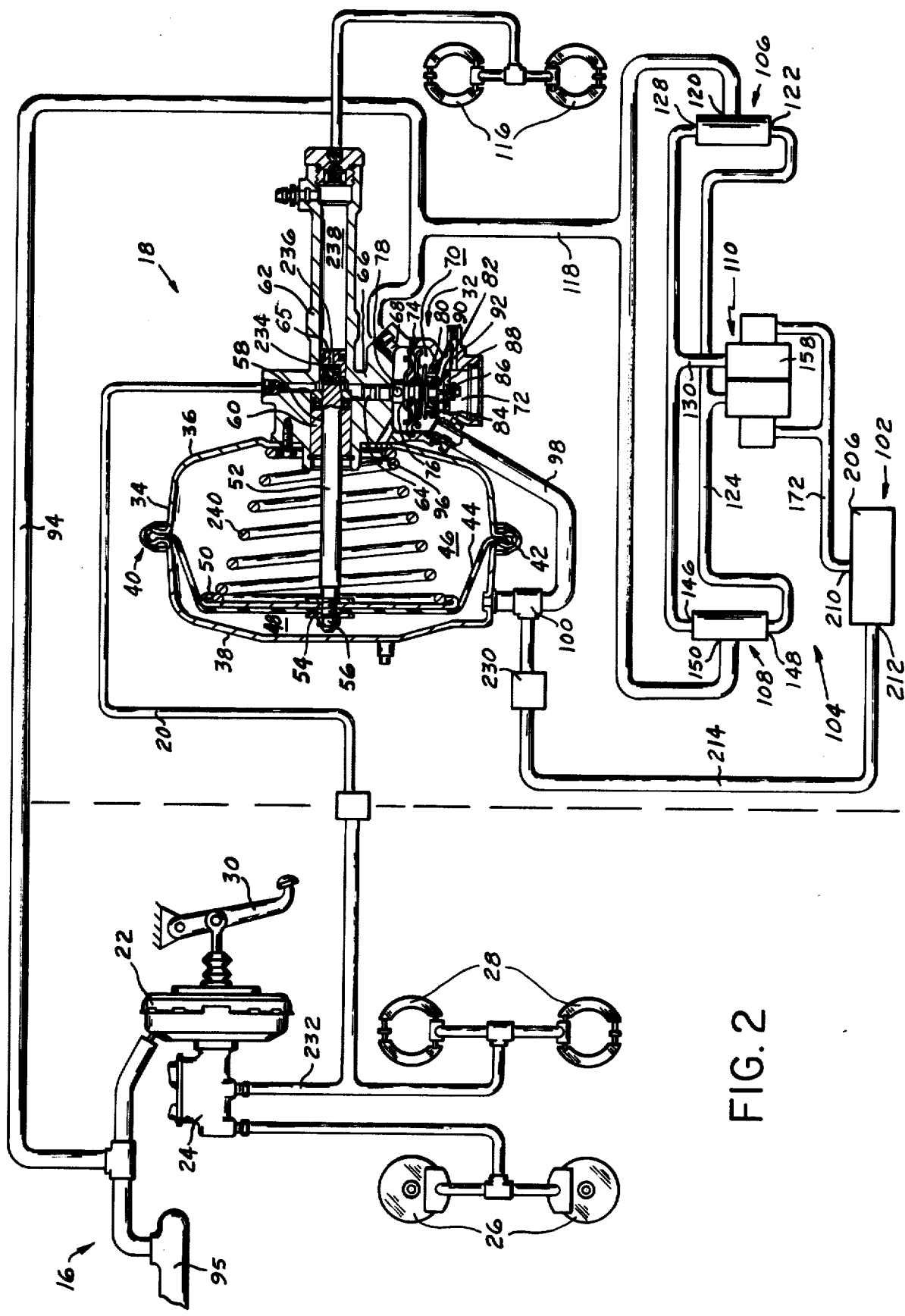
FIG. 2 is a schematic illustration of a braking system for the tow vehicle-trailer combination of FIG. 1.

The tow vehicle 12, shown in FIG. 1 has a braking system 16 shown in FIG. 2 and the trailer 14 has a separate braking system 18 interconnected by an actuation conduit 20.

The braking system 16 for the tow vehicle has a first servomotor 22 connected to a master cylinder 24 for supplying the left and right front wheels 26 and the left and right rear wheels 28 with pressurized fluid in response to an input force being applied to pedal 30.

The same pressurized fluid transmitted to the rear wheels 28 is carried in conduit 20 to operated control valve means 32 of the servomotor 34 in braking system 18.

The servomotor 34 has a front shell 36 joined to a rear shell 38 by a twist lock connection 40. The twist lock connection 40 holds a bead 42 of a diaphragm 44 which separates a front chamber 46 from a rear chamber 48. The diaphragm 44 has an axial opening 54 through which a push rod 52 extends to hold a backing plate 50 against the diaphragm when fastener 56 is attached to the push rod 52. The push rod 52 extends through a seal 60 in bore 58 of housing 62 to operate piston 65 contained therein.

The control valve means 32 has a housing 66 with a vacuum chamber 68, a control chamber 70, and an atmospheric chamber 72.

A diaphragm 74 which separates the vacuum chamber 68 from the control chamber 70 has a tubular plunger 76 located at its axial center. The tubular plunger 76 has a cross bore 78 in the vacuum chamber 68 to permit vacuum communication into the control chamber 70. A spring 80 located in the control chamber 70 holds the tubular plunger 76 against the piston 64.

A poppet valve 82 which separates the control chamber 70 from the atmospheric chamber 72 has a face 84 separated from a resilient cap 86 by a stem 88. A spring 90 acting on face 84 holds the resilient cap in a sealing relationship with atmospheric port 92 to permit vacuum communicated to the vacuum chamber 68 in conduit 94 from the intake manifold 95 in the tow vehicle to evacuate air from the front chamber 46 through passage 96 and the rear chamber 48 by way of conduit 98 of the servomotor 34.

A tee 100 in conduit 98 connects a servomotor 34 with the control means 102 and anti-sway 104. A first sensor 106 located at the front of the trailer 14 and a second sensor 108 located at the rear of the trailer 14 are connected to a comparator means 110. The comparator means 110 will evaluate the output signals from the first sensor 106 and second sensor 108 to generate an independent brake actuation signal when the lateral force generated by oscillations between the front of the trailer and the rear of the trailer reach a predetermined level. The independent brake actuation signal from the comparator is transmitted to the control means 102 and relayed to the servomotor 34 during periods when the tow vehicle 12 is traveling with a uniform or decreasing velocity.

Figure 3:
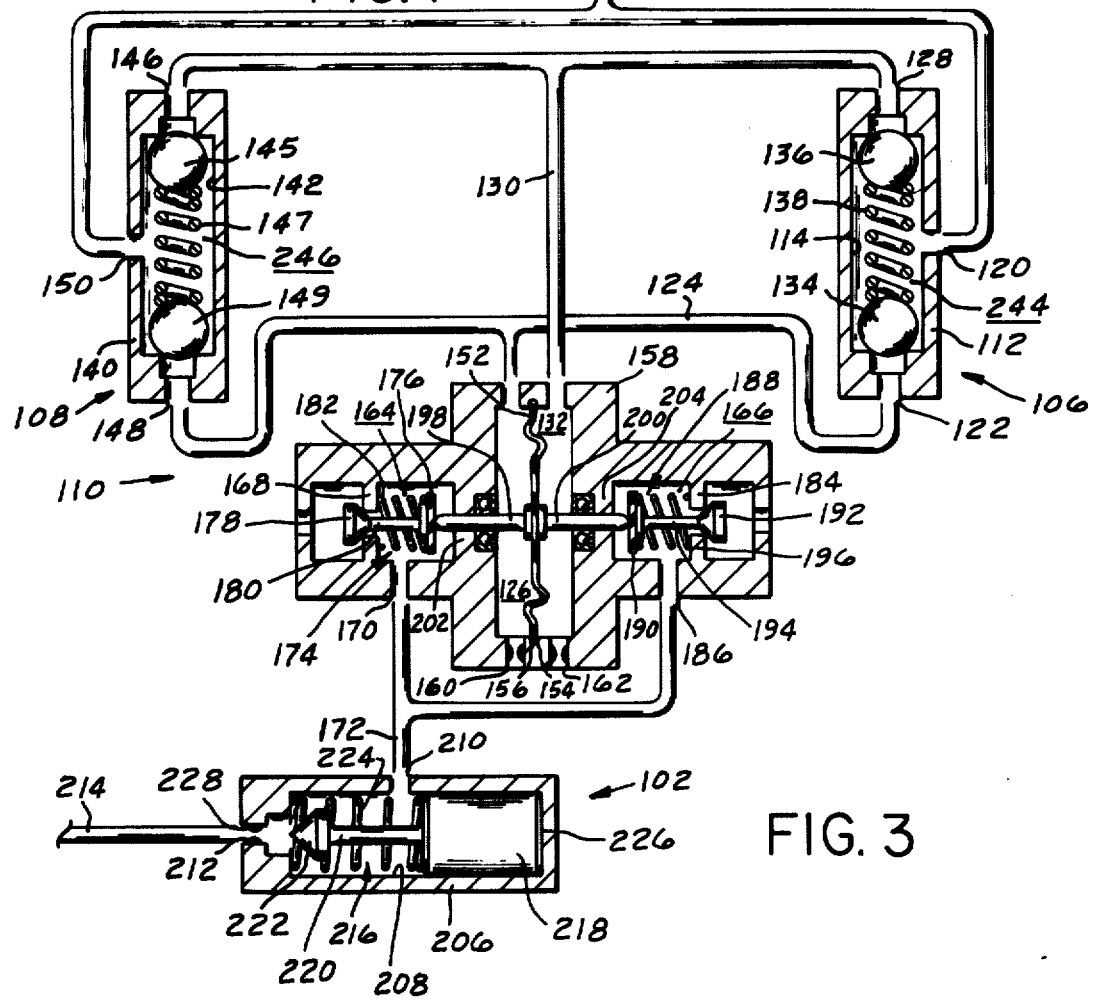
FIG. 3 is a sectional view of the anti-sway apparatus schematically shown in FIG. 2.

The first sensor 106 consists of a housing 112, see FIG. 3, having a bore 114 therein which is substantially parallel to the axis of the left and right wheel brake assembly 116 on the trailer 14. The bore 114 is connected to vacuum available in conduit 94 by conduit 118 secured to outlet port 120. A first inlet port 122 is connected by conduit 124 to a first chamber 126 in the comparator means 110. A second inlet port 128 is connected by conduit 130 to a second chamber 132 in the comparator means 110. A first ball weight means 134 is located in bore 114 adjacent the first inlet port 122 and a second ball weight 136 is located adjacent the second inlet port 128. The first ball weight means 134 and the second ball weight means 136 are held against housing surrounding the first and second inlet ports by resilient means 138.

The second sensor means 108 has a housing 140 substantially parallel to housing 112 with a bore 142 therein. The bore 142 has a first inlet port 146, a second inlet port 148, and an outlet port 150. The first inlet port 146 is connected to conduit 130 going to chamber 132 in the comparator means 110. The second inlet port 148 is connected to conduit 124 going to chamber 126 in the comparator means 110. The outlet port 150 is connected to conduit 118 through which vacuum from the manifold is communicated.

A first ball weight means 145 is located in bore 142 adjacent the first inlet port 146 and a second ball weight means 149 is correspondingly located adjacent the second inlet port 148. A resilient means 147 acts on the first 145 and second 149 ball weight means to seal the corresponding first and second inlet ports from the outlet port 150.

The first chamber 126 in the comparator means 110 is separated from the second chamber 132 by a diaphragm 152. The diaphragm 152 has a bead 154 which is secured in a groove 156 in the housing 158. The housing 158 has a first opening 160 and a second opening 162 through which air at atmospheric pressure is permitted to pass at a restricted flow rate into the first chamber 126 and the second chamber 132, respectively.

The housing 158 has a first atmospheric cavity 164 adjacent the first chamber 126 and a second atmospheric cavity 166 adjacent the second chamber 132. The first atmospheric cavity has an inlet port 168 through which air at atmospheric pressure can flow therethrough to the outlet port 170. The outlet port 170 is connected to the control means 102 by conduit 172.

A poppet means 174 has a head 176 separated from a resilient face 178 by a stem 180. A spring 182 located in the first cavity acts on head 176 to hold face 178 against the housing surrounding the inlet port 168 to seal the first cavity 164 from the atmosphere.

The second atmospheric cavity 166 has an inlet port 184 through which air at atmospheric pressure can flow therethrough to the outlet port 186. The outlet port 186 is connected to conduit 172 going to the control means 102.

A poppet means 188 has a head 190 separated from a resilient face 192 by a stem 194. A spring 196 located in the second cavity acts on head 190 to hold face 192 against the housing surrounding the inlet port 184 to seal the second cavity 166 from the atmosphere.

A first push rod 198 attached to diaphragm 152 extends through wall 202 separating the first cavity 164 from the first chamber 126 into abutting engagement with head 176. A second push rod 200 attached to diaphragm 152 extends through wall 204 separating the second cavity 166 from the second chamber 132 into abutting engagement with head 190.

The control means 102 consists of a housing 206 having a bore 208 therein. The bore has an entrance port 210 connected to conduit 172 and an exit port 212 connected to conduit 214 coming from tee 100. A piston means 216 has a cylindrical body 218 from which an axial stem 220 extends toward the exit port 212. A tapered face 222 attached to the end of stem 220 is held away from the exit port 212 by spring or resilient means 224 which acts on and holds the cylindrical body 218 against the bottom 226 of the bore 208. A restriction 228 located in the exit port 212 will control the rate at which air at atmospheric pressure can pass from the entrance port 210 through the bore 208 into conduit 214 for presentation to the servomotor as a brake actuation signal.

MODE OF OPERATION OF THE PREFERRED EMBODIMENT

With the tow vehicle-trailer combination traveling along a highway with a constant velocity the anti-sway means 104 will be inactive as shown in FIG. 3. When an operator wishes to stop this combination an input force is applied to pedal 30 to activate servomotor 22. The output from servomotor 22 will operate the master cylinder 24 to provide pressurized fluid for engaging the front wheel brakes 26 and the rear wheel brakes 28 of the tow vehicle 12.

The fluid under pressure present in conduit 232 oing to the rear brakes 28 will be carried through conduit 2... act on piston 64 in the control means 32 for servomotor 34. The fluid under pressure acting on piston 64 will move tubular plunger 76 against face 84 of the poppet valve 82 to initially interrupt vacuum communication with the control chamber 70 and thereafter unseat resilient cap 86 from the atmospheric port 92. With resilient cap 86 away from the atmospheric port, air at atmospheric pressure will enter the control chamber 70 and be communicated by conduit 98 to the rear chamber 48 of the servomotor 34. With air at atmospheric pressure in the rear chamber 48 and vacuum in the front chamber 46, an operational pressure differential will act on the diaphragm 44 and backing plate 50 to move the push rod 52. Initial movement of push rod 52 will seat end 234 in piston 65 to close compensating port 236. Further movement of the push rod 32 will pressurize fluid in chamber 238 of housing 62 to supply and operate the wheel brakes 116 on the trailer in uniformity with the tow vehicle 12.

A check valve 230 adjacent tee 100 in conduit 98 will prevent air flowing in conduit 98 from entering conduit 214 and thereby reduce the time of response in actuation of the servomotor 34.

Upon termination of the input force on pedal 30, the pressurizing force to produce the hydraulic fluid will cease and the front brakes 26, rear brakes 28, and actuation force on piston 64 released. Spring 80 will now move the tubular plunger 76 away from face 84 and vacuum available in conduit 94 will evacuate air from the rear chamber 48. With the air removed from the rear chamber 48, spring 240 will move the backing plate 50 and diaphragm toward the rear chamber to release the force produced by the hydraulic fluid under pressure for operating the wheel brakes 116 of the trailer.

When the tow vehicle-trailer combination is traveling along a highway and the trailer begins to oscillate, a lateral force will be produced on the ball weight means 134, 136, 145 and 149. When the lateral force is sufficient to move a corresponding set of ball weight means such as 134 and 149 away from inlet ports 122 and 148, the vacuum available in chambers 244 and 246 evacuates air from chamber 126. When the air is evacuated from chamber 126, a pressure differential will be created across the wall means or diaphragm 152. This pressure differential will move push rod 198 to unseat face 178 from the atmospheric port 168. With face away from the atmospheric port 168, air at atmospheric pressure will flow in conduit 172 past control means 102 and through conduit 214 to tee 100 in conduit 98. A portion of this air flow will be directed to the rear chamber 48 while the remaining portion will be evacuated through the control chamber 70 by the vacuum available in conduit 94. That portion of the air flow which is directed into the rear chamber 48 will create an operational pressure differential with the vacuum in the front chamber 46. This pressure differential will cause the push rod 52 to move piston 64 and pressurize the fluid contained in chamber 238 sufficiently to independently operate the wheel brakes 116 on the trailer. With the wheel brakes 116 on the trailer activated, the trailer 14 will accelerate at a lesser rate than the tow vehicle 12 causing a lengthening out of the combination to thereby eliminate the oscillatory forces.

However, if the opereator of the tow vehicle 12 is moving from one lane to another lane as when passing, an acceleration force will be present which will move the cylindrical body 218 by overcoming spring 224 and thereby prevent a brake actuation signal from being transmitted from the comparator means 110.

When the tow vehicle 12 and trailer 14 are both traveling in an arc wherein a lateral force is sufficient to move the ball weight means away from its corresponding inlet port for example, ball weight means 134 and 145 will move away from inlet ports 122 and 146, respectively, to simultaneously evacuate air from chambers 126 and 132 to nullify the development of any brake actuation signal.

Thus, we have produced an anti-sway means 104 for independently supplying the servomotor 34 with a brake actuation signal to apply the wheel brakes 116 on the trailer.

Figure 4:
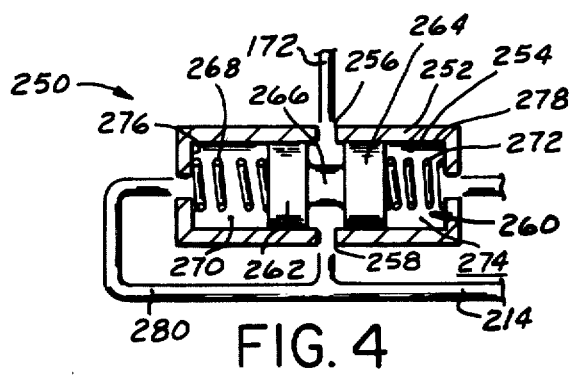
FIG. 4 is a sectional view of another embodiment of a control means for the anti-sway apparatus in FIG. 3.

If the brake actuation signal as represented by the flow of air and atmospheric pressure becomes too strong, a control means 250 as shown in FIG. 4 will replace control means 102.

The control means 250 has a housing 252 with a bore 254 therein. The bore 254 has an entrance port 256 therein connected to conduit 172 and an exit port 258 connected to conduit 214 going to the rear chamber 48 of the servomotor 34. A piston means 260 located in bore 254 has a first cylindrical body 262 separated from a second cylindrical body 264 by a stem 266. A first reaction chamber 270 is formed in bore 254 between the first cylindrical body 262 and the bottom 276. A second reaction chamber 274 is formed in the bore 254 between the second cylindrical body 264 and the end 278. A first resilient means 268 located in the first reaction chamber acts on the first cylindrical body 262 to resist movement of the piston means by a pressure differential created by air at atmospheric pressure which is free to enter the second reaction chamber 274 and vacuum in the first reaction chamber 270. Vacuum is communicated to the first reaction chamber 270 by conduit 280 which is connected to conduit 214 adjacent the exit port 258. A light spring 272 located in the second reaction chamber 274 will initially aid in positioning the piston means 260 in the bore 254. This spring 272 will establish the lower limit for a longitudinal acceleration force which will move the first cylindrical body to close the communication between the entrance port 256 and the exit port 258.

When the comparator means 110 sends a braking signal in the form of air at atmospheric pressure through conduit 172 as this braking signal is communicated through conduit 214 to the servomotor 34, a portion of this air will be communicated through conduit 280 to the first reaction chamber 270. As the air flows into the reaction chamber 270, the centering pressure differential will dissipate allowing spring 260 to proportionally close the entrance port 256 as the first cylindrical body 262 moves toward the second reaction chamber 274. Thus, it is possible to prevent the brake actuation signal from being created which could cause wheel lock up in the trailer.

We claim:

1. An anti-sway apparatus for use in a braking system of a tow vehicle-trailer combination to reduce motion adverse to a direction of travel, said anti-sway apparatus comprising:

first sensor means located in said tow vehicle-trailer combination having first weight means responsive to lateral movement for establishing a first signal;

second sensor means located on said tow vehicle-trailer combination, a fixed distance from said first sensor means having second weight means responsive to lateral movement for establishing a second signal;

comparator means connected to said first sensor means and said second sensor means for developing a brake actuation signal for simultaneously operating the brakes of the trailer when said first signal is different than said second signal; and control means located on said tow vehicle-trailer combination for nullifying said brake actuation signal during periods of longitudinal acceleration of the tow vehicle-trailer combination.

2. The anti-sway apparatus, as recited in claim 1 wherein said first sensor means includes:

a first housing having a first bore therein, said first bore having a first inlet port, a second inlet port, and a first outlet port, said first inlet port being connected to said comparator means by a first conduit, said second inlet port being connected to said comparator means by a second conduit, said first outlet port being connected to a source of vacuum;

first ball means located in said first bore adjacent said first inlet port for controlling communication therebetween with the first outlet port;

second ball means located in said first bore adjacent said second inlet port for controlling communication therebetween with the first outlet port; and first resilient means located in said first bore for urging said first and second ball means toward a corresponding seat on the first housing surrounding the first and second inlet ports.

3. The anti-sway apparatus, as recited in claim 2, wherein said lateral movement causes one of said first and second ball means to move away from the first housing and allow vacuum available at said first outlet port to evacuate air through the corresponding first and second conduits to develop said first signal.

4. The anti-sway apparatus, as recited in claim 3 wherein said second sensor means includes:

a second housing having a second bore therein, said second bore having a third inlet port, a fourth inlet port, and a second outlet port, said third inlet port being connected to said first conduit, said second inlet port being connected to said second conduit, said second outlet port being connected to said source of vacuum;

third ball means located in said second bore adjacent the third inlet port for controlling communication therebetween with the second outlet port;

fourth ball means located in said second bore adjacent the fourth inlet port for controlling communication therebetween with the second outlet port; and second resilient means located in said second bore for urging said third and fourth ball means toward a corresponding seat on the second housing surrounding the third and fourth inlet port.

5. The anti-sway apparatus, as recited in claim 4, wherein said lateral movement causes one of said third and fourth ball means to move away from the second housing and allow vacuum available at the second outlet port to evacuate air through the corresponding first and second conduits to develop said second signal in synchronization with said first signal.

6. The anti-sway apparatus, as recited in claim 5, wherein said comparator means includes:

a third housing having a first cavity, a second cavity, and a third cavity, said first cavity being connected to said first and second conduits, said second and third cavities being connected to the atmosphere and to said control means;

wall means secured to said third housing for dividing the first cavity into a first chamber and a second chamber, said first and second chambers being connected to the atmosphere by first and second openings, respectively;

first poppet means associated with the second cavity to prevent free communication of atmosphere therethrough to the control means;

second poppet means associated with the third cavity to prevent free communication of atmosphere therethrough to the control means; and connecting means attached to said wall means for engaging said first and second poppet means to allow air to flow to said control means in response to a pressure differential developing across the wall means upon presentation of the first and second signals through the first and second conduits to the first and second chambers, respectively.

7. The anti-sway apparatus, as recited in claim 6, wherein said control means includes:

a fourth housing having a fourth cavity therein, said fourth cavity having an entrance port and an exit port; and piston means located in said fourth cavity and moved by responding to acceleration forces for interrupting the communication of air flow from the entrance port to the exit port.

8. The anti-sway apparatus, as recited in claim 7, wherein said piston means includes:

a cylindrical body having a fixed mass;

stem means attached to said cylindrical body, said stem means having a face thereon; and resilient means located in said cavity for holding said face on the stem means away from said exit port until a predetermined acceleration force overcomes the resilient means and moves the cylindrical body to seat the face on the fourth housing and seal the exit port.

9. The anti-sway apparatus, as recited in claim 7 wherein said piston means includes:

a first cylindrical body separated from a second cylindrical body by a stem, said first cylindrical body and the fourth housing forming a first reaction chamber, said second cylindrical body and the fourth housing forming a second reaction chamber, said first reaction chamber being adapted to receive the brake actuation signal derived by air flow through said exit port, said second actuation chamber being adapted to receive air at atmospheric pressure; and resilient means located in said fourth cavity for positioning said first and second cylindrical bodies to permit uninhibited air flow from the entrance port to the exit port until said actuation signal presented to the actuation chamber can move the first cylindrical body into a sealing position with the entrance port.

* * * * *